(12) United States Patent
Osawa et al.

(10) Patent No.: US 8,655,192 B2
(45) Date of Patent: Feb. 18, 2014

(54) POLARIZATION DIVERSITY OPTICAL SYSTEM DEVICE, DEMODULATOR AND TRANSCEIVER

(75) Inventors: Kentaro Osawa, Kokubunji (JP); Hideharu Mikami, Kawasaki (JP)

(73) Assignee: Oclaro Japan, Inc., Kanagawa (JP)

( * ) Notice: Subject to any disclaimer, the term of this patent is extended or adjusted under 35 U.S.C. 154(b) by 135 days.

(21) Appl. No.: 13/072,819

(22) Filed: Mar. 28, 2011

(65) Prior Publication Data

US 2011/0249976 A1 Oct. 13, 2011

(30) Foreign Application Priority Data

Apr. 13, 2010 (JP) ................................. 2010-092673

(51) Int. Cl.
*H04B 10/06* (2011.01)
*H04B 10/12* (2011.01)

(52) U.S. Cl.
USPC ............ 398/205; 398/202; 398/207; 398/212

(58) Field of Classification Search
USPC ................................................ 398/202–214
See application file for complete search history.

(56) References Cited

U.S. PATENT DOCUMENTS

| | | | | |
|---|---|---|---|---|
| 5,027,436 A * | 6/1991 | Delavaux | ...................... | 398/202 |
| 5,115,332 A * | 5/1992 | Naito et al. | .................... | 398/202 |
| 5,185,828 A * | 2/1993 | van der Tol | ..................... | 385/28 |
| 8,204,378 B1 * | 6/2012 | Marsland et al. | ............... | 398/65 |
| 2007/0223932 A1* | 9/2007 | Hsieh | ............................ | 398/152 |
| 2008/0008475 A1* | 1/2008 | Barbarossa et al. | ............ | 398/85 |
| 2008/0085121 A1 | 4/2008 | Tomaru | | |
| 2008/0267638 A1* | 10/2008 | Nakashima et al. | .......... | 398/208 |
| 2010/0098411 A1* | 4/2010 | Nakashima et al. | ............ | 398/25 |
| 2010/0221020 A1* | 9/2010 | Koc | ............................. | 398/205 |

FOREIGN PATENT DOCUMENTS

| | | |
|---|---|---|
| JP | 01-209431 | 8/1989 |
| JP | 03-251827 | 11/1991 |
| JP | 2008-92484 | 4/2008 |

* cited by examiner

*Primary Examiner* — Daniel Dobson
(74) *Attorney, Agent, or Firm* — Antonelli, Terry, Stout & Kraus, LLP.

(57) ABSTRACT

A polarization diversity optical system device includes: a polarization split unit that splits a first coherent light into a first split light and a second split light whose polarization components are orthogonal to each other, and splits a second coherent light into a third split light and a fourth split light whose polarization components are orthogonal to each other; and a light combining unit that combines the first split light with one of the third split light and the fourth split light, and combines the second split light with the other of the third split light and the fourth split light.

9 Claims, 9 Drawing Sheets

POLARIZATION DIVERSITY OPTICAL SYSTEM DEVICE, DEMODULATOR AND TRANSCEIVER

CLAIM OF PRIORITY

The present application claims priority from Japanese patent application JP 2010-092673 filed on Apr. 13, 2010, the content of which is hereby incorporated by reference into this application.

FIELD OF THE INVENTION

The present invention relates to a polarization diversity optical system device, a demodulator, and a transceiver, and more particularly to a polarization diversity optical system device, a demodulator, and a transceiver in a coherent optical communication system.

BACKGROUND OF THE INVENTION

With a recent demand for a large-capacity network, attention has been paid to a coherent optical communication. This is a communication system in which information is superimposed on a phase or frequency of a light and transmitted, and interferes with a light (hereinafter referred to as "local light") from a local oscillator located at a receiver side to demodulate a signal.

In the coherent communication system, because a signal light propagated through an optical fiber fluctuates in a polarization direction, there arises such a problem that an interference efficiency of the local light and the signal light is deteriorated, and a receiving sensitivity temporally fluctuates. As means for solving this problem, a polarization diversity detecting system is proposed. This is a method in which the signal light that is in an arbitrary polarization state is divided into two polarization components orthogonal to each other. Each of the polarization components is superimposed on the local light having the polarization directions matched with those of the polarization components to generate the interference light, and a stable receiving sensitivity is realized.

Japanese Patent Application Publication No. Hei3(1991)-251827 discloses a method for implementing polarization diversity detection in which the signal light and the local light are subjected to polarization split, and the respective polarization components are combined with each other by a half beam splitter to generate the interference light.

Japanese Patent Application Publication No. Hei1(1989)-209431 discloses that after the polarization components orthogonal to each other are combined together simultaneously when the signal light and the reference light are subjected to polarization split, the polarization directions match each other to generate the interference light.

Japanese Patent Application Publication No. 2008-92484 discloses that the interference light is generated from a combined light with the help of an optical 90-degree hybrid to conduct phase diversity detection.

SUMMARY OF THE INVENTION

FIG. 9 is a diagram for describing a polarization diversity optical system device 900 in which the respective polarization components orthogonal to each other are combined together while the signal light and a reference light are subjected to polarization split, as disclosed Japanese Patent Application Publication No. Hei1(1989)-209431. A signal light S0 having an arbitrary polarization state (p-polarization component $S0_p$, s-polarization component $S0_s$) and a local light L0 of 45-degree linear polarization (p-polarization component $L0_p$, s-polarization component $L0_s$) are input to a polarization beam splitter 930. The p-polarization components $S0_p$ and $L0_p$ of the respective lights are transmitted through the polarization beam splitter 930, and the s-polarization components $S0s$ and $L0_s$ are reflected from the polarization beam splitter 930. In this situation, the s-polarization component $S0_s$ of the signal light and the p-polarization component $L0_p$ of the local light are combined together into C91, and the p-polarization component $S0_p$ of the signal light and the s-polarization component $L0_s$ of the local light are combined together into C92. The generated combined lights C91 and C92 become interference lights I91 to I98 by interference light generators 940 and 950, and are then output.

In this example, since a polarization separation element such as the polarization beam splitter 930 is incomplete, a part of the s-polarization component to be originally totally reflected is transmitted, or a part of the p-polarization component to be totally transmitted is reflected. As a result, a leak light occurs. The leak light interferes with the signal light, resulting in an error of the output signal. This leads to a risk that the signal cannot be demodulated with precision.

The present invention has been made in view of the above circumstances, and therefore aims at reducing a leak light contained in an output interference light in polarization diversity detection.

According to the present invention, there is provided a polarization diversity optical system device, including: a polarization split unit that splits a first coherent light into a first split light and a second split light of two polarization components orthogonal to each other, and splits a second coherent light into a third split light and a fourth split light of two polarization components orthogonal to each other; and a light combining unit that combines the first split light with one of the third split light and the fourth split light, and combines the second split light with the other of the third split light and the fourth split light, wherein the light combining unit has a polarization split function.

Also, the polarization diversity optical system device according to the present invention further includes a polarization rotation unit such as a half-wave plate, which rotates polarization of two split lights of the first to fourth split lights by 90 degrees.

Also, in the polarization diversity optical system device according to the present invention, one of the first coherent light and the second coherent light is a local light output from a local oscillator, and the other of the first coherent light and the second coherent light is a signal light on which information is superimposed.

Also, in the polarization diversity optical system device according to an aspect of the present invention, the polarization split unit and the light combining unit are realized by one combined-light generator, and the combined-light generator has one polarization beam splitter.

Also, in the polarization diversity optical system device according to another aspect of the present invention, the polarization split unit is a beam displacer, and the light combining unit is a polarization beam splitter.

Also, in the polarization diversity optical system device according to another aspect of the present invention, the polarization split unit and the light combining unit are beam displacers different from each other.

Also, the polarization diversity optical system device according to another aspect of the present invention further includes an interference light generator that converts the combined light into an interference light.

According to another aspect of the present invention, there is provided a demodulator, including: one of the above-mentioned polarization diversity optical system devices, and a photodetector that detects a light output from the polarization diversity optical system device, and outputs an electric signal.

According to another aspect of the present invention, there is provided an optical transceiver having a transmitter and a receiver wherein the receiver has the above-mentioned demodulator and the transmitter has a phase modulator that superimposes a signal on a coherent light.

According to the aspects of the present invention, because the generated leak light can be more reduced, an error in the output signal is decreased, and the signal can be demodulated with precision.

DETAILED DESCRIPTION OF THE PREFERRED EMBODIMENTS

Figure 1:
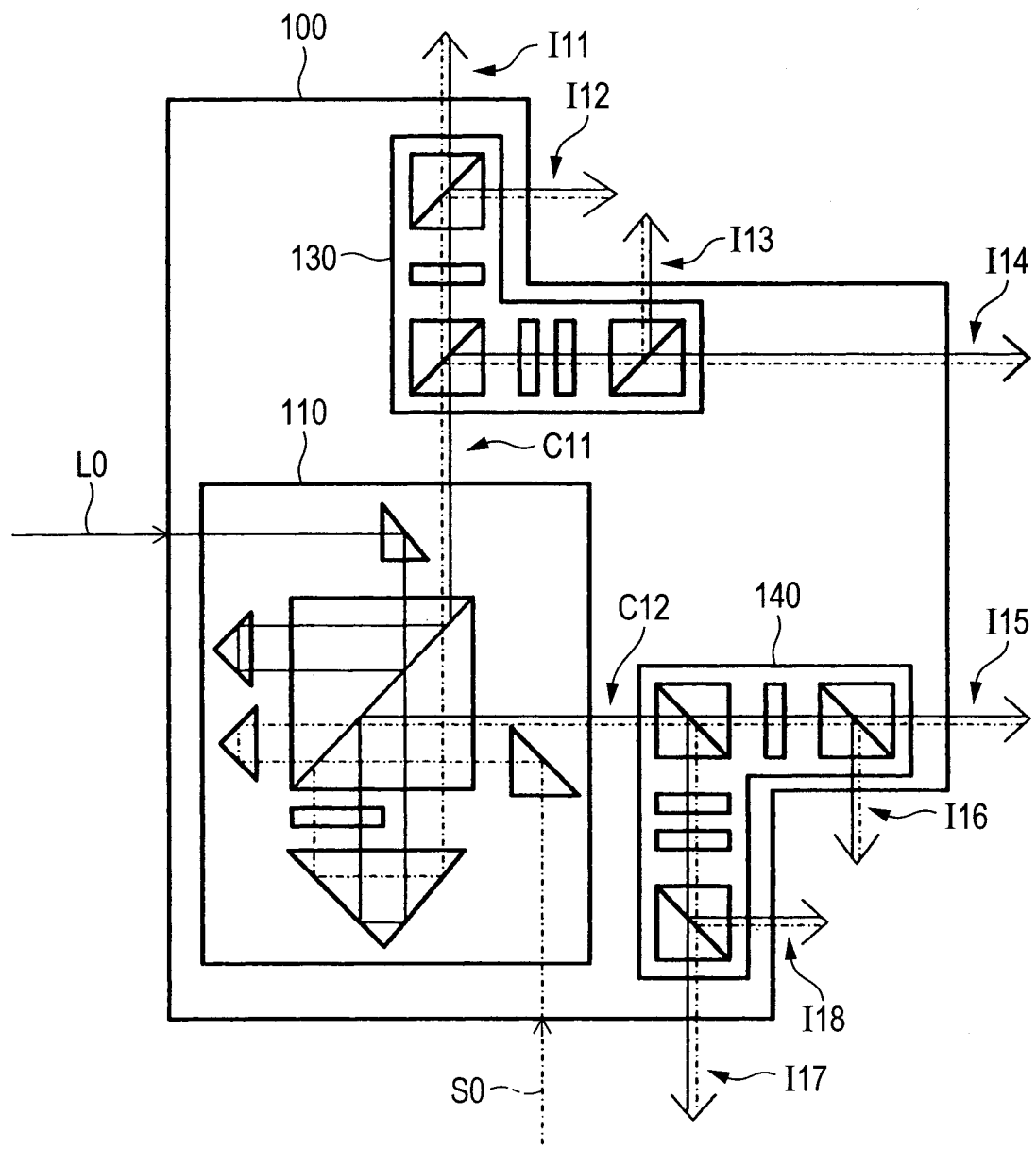
FIG. 1 is a diagram schematically illustrating a polarization diversity optical system device according to a first embodiment of the present invention.

Hereinafter, embodiments of the present invention will be described with reference to the accompanying drawings. In the drawings, same or similar elements are denoted by identical symbols, and a repetitive description will be omitted.

First Embodiment

FIG. 1 is a diagram schematically illustrating a polarization diversity optical system device 100 according to a first embodiment of the present invention. As illustrated in FIG. 1, the polarization diversity optical system device 100 includes: a combined-light generator 110 that outputs combined lights C11 and C12 from a local light L0 emitted from an external local oscillator and a signal light S0 on which a signal is superimposed; an optical 90-degree hybrid 130 that generates interference lights I11 to I14 from the combined light C11; and an optical 90-degree hybrid 140 that generates interference lights I15 to I18 from the combined light C12.

Figure 2:
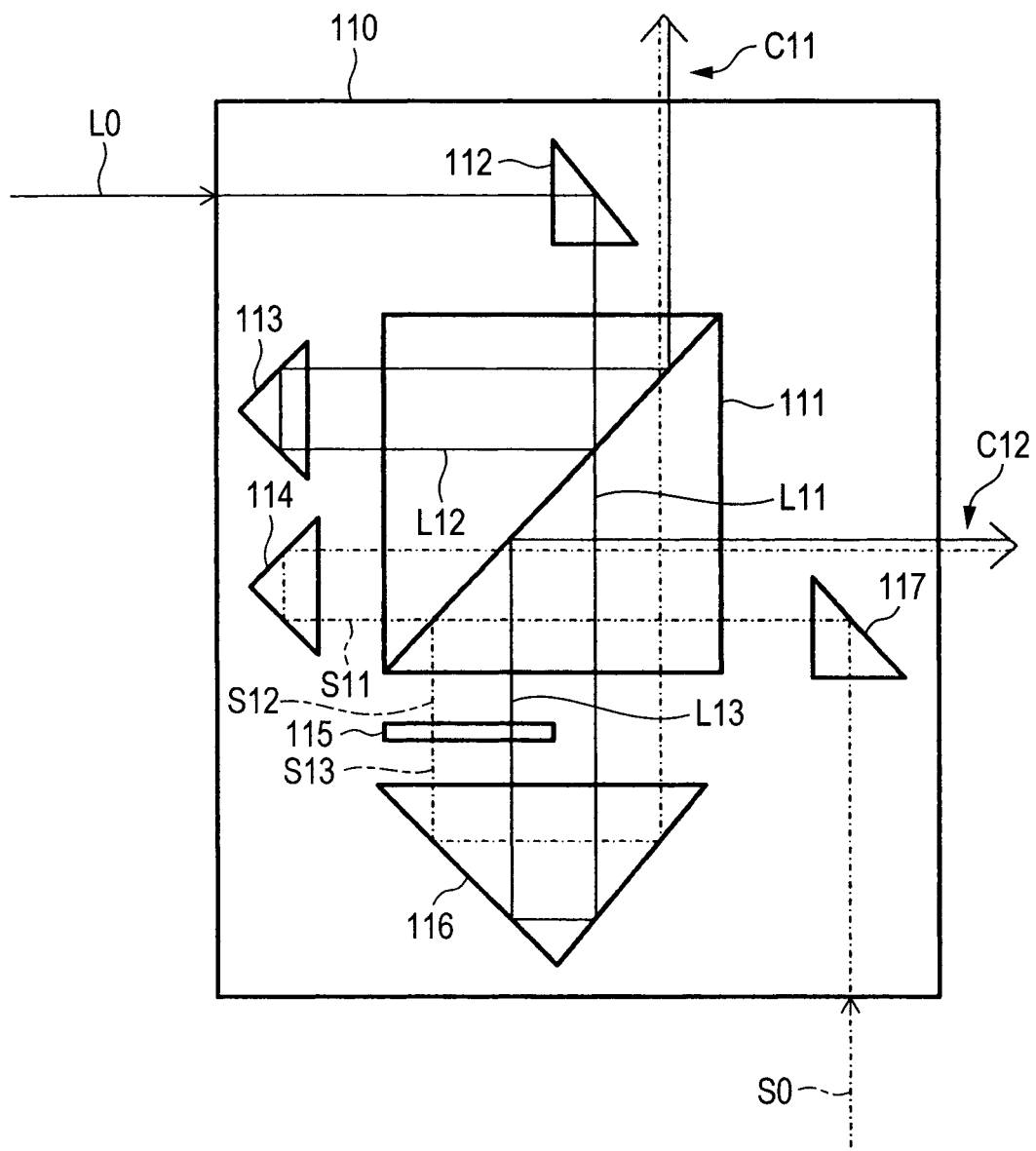
FIG. 2 is a diagram illustrating a combined-light generator in the polarization diversity optical system device of FIG. 1 in detail.

FIG. 2 illustrates the combined-light generator 110 in more detail. As illustrated in FIG. 2, the combined-light generator 110 includes: a polarization beam splitter 111 that splits the local light L0 and the signal light S0, and combines the split lights together; a half-wave plate 115 that rotates the polarization of the split lights by 90°; and prisms 112, 113, 114, 116, and 117 that each reflect a light so as to input the light to the polarization beam splitter 111.

Figure 3:
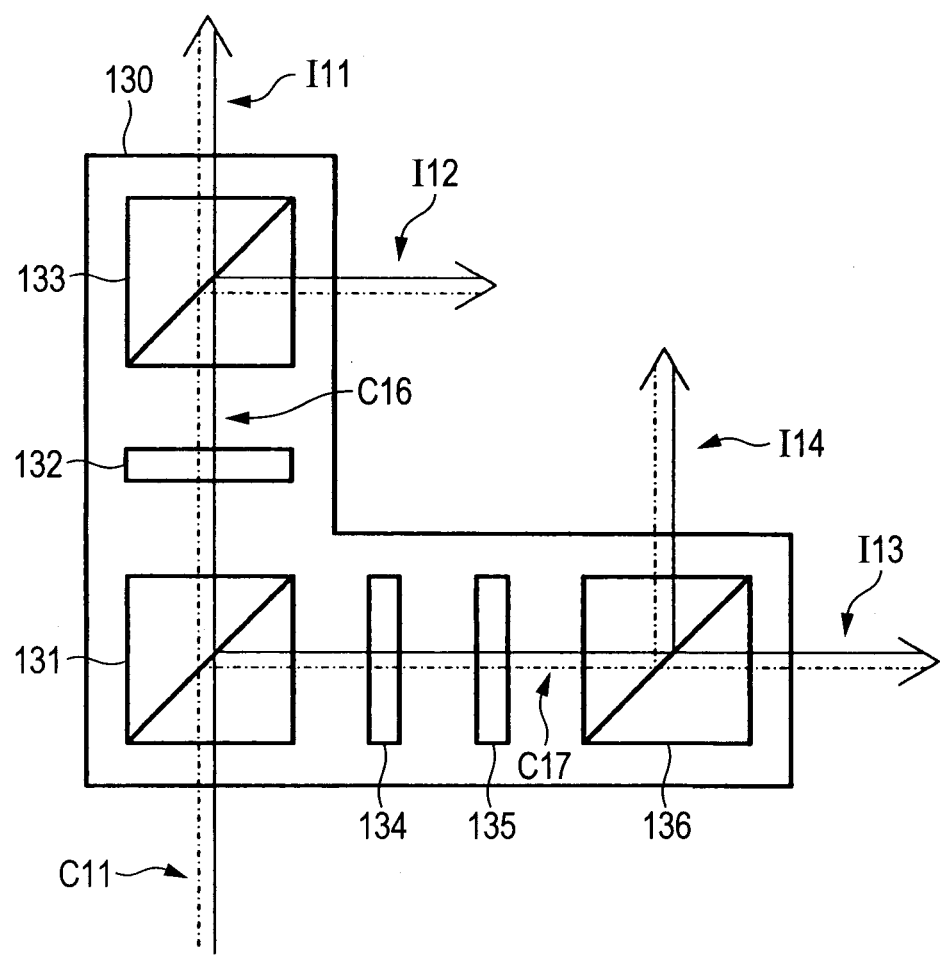
FIG. 3 is a diagram illustrating an optical 90-degree hybrid in the polarization diversity optical system device of FIG. 1 in detail.

FIG. 3 illustrates the optical 90-degree hybrid 130 in more detail. As illustrated in FIG. 3, the optical 90-degree hybrid 130 that generates the interference lights includes: a non-polarization beam splitter 131 that branches an incident light at an intensity ratio 1:1; half-wave plates 132 and 135 that each rotate the polarized light by 45°; a quarter-wave plate 134 that produces a phase difference of 90°; and polarization beam splitters 133 and 136. The same configuration is applied to the optical 90-degree hybrid 140, and therefore a repetitive description thereof will be omitted.

Returning to FIG. 2, an optical path in the combined-light generator 110 will be described in detail. The signal light S0 that propagates through an optical fiber and comes to an arbitrary polarization state is reflected by the prism 117. Thereafter, the signal light S0 is polarization split by the polarization beam splitter 111 to generate branched signal lights S11 and S12. After the branched signal light S11 is reflected by the prism 114, the branched signal light S11 is again input to the polarization beam splitter 111. The branched signal light S12 passes through the half-wave plate 115 (a fast axial direction is at 45° with respect to an s-polarization) where the polarization rotates by 90°, and produces a branched signal light S13. Thereafter, the branched signal light S13 is reflected by the prism 116, and again input to the polarization beam splitter 111.

On the other hand, after the local light L0 which is a linearly polarized light of 45° is reflected by the prism 112, the local light L0 is polarization split by the polarization beam splitter 111 to generate branched local lights L11 and L12. After the branched local light L11 is reflected by the prism 116, the branched local light L11 passes through the half-wave plate 115 where the polarization rotates by 90°, to produce a branched local light L13, and is again input to the polarization beam splitter 111. After the branched local light L12 is reflected by the prism 113, the branched local light L12 is again input to the polarization beam splitter 111.

The branched signal light S13 and the branched local light L12, which are input to the polarization beam splitter 111, are combined together by the polarization beam splitter 111 to generate the combined light C11. Likewise, the branched signal light S11 and the branched local light L13 are combined together by the polarization beam splitter 111 to generate the combined light C12. The combined lights C11 and C12 are input to the optical 90-degree hybrid 130 and the optical 90-degree hybrid 140, which are interference light generators, respectively.

Referring to FIG. 3, an optical path in the optical 90-degree hybrid 130 will be described in detail. The combined light C11 input to the optical 90-degree hybrid 130 is branched by the non-polarization beam splitter 131 at an intensity ratio 1:1 to generate two branched combined lights. One branched combined light is rotated in polarization by 45° through the half-wave plate 132 (the fast axial direction is at 22.5 degrees with respect to the s-polarization) to produce a first branched combined light C16. Thereafter, the branched combined light is polarization split by the polarization beam splitter 133 so that the signal light and the local light included in the first branched combined light C16 match each other in the polarization direction, to generate the interference lights I11 and I12.

Those interference lights I11 and I12 are detected by a detector, and a signal proportional to an intensity difference of the detected two interference lights is output so that the first output signal (I-signal) to the s-polarization component of the signal light in the phase diversity detection can be acquired.

Also, the other branched combined light is first given a phase difference of 90 degrees between the signal light and the local light included in the branched combined light by the quarter-wave plate 134 (the fast axial direction is parallel to the s-polarization direction). Thereafter, the other branched combined light is rotated in polarization by 45 degrees through the half-wave plate 135 (the fast axial direction is at 22.5 degrees with respect to the s-polarization) to produce a second branched combined light C17. Thereafter, the other branched combined light is polarization split by the polarization beam splitter 136 so that the signal light and the local light included in the second branched combined light C17 match each other in the polarization direction, to generate the interference lights I13 and I14.

Those interference lights are detected by the detector, and a signal proportional to an intensity difference of the detected two interference lights is output so that the second output signal (Q-signal) to the s-polarization component of the signal light in the phase diversity detection can be acquired.

In the same manner, the interference lights I15 to I18 are generated by the optical 90-degree hybrid 140, and those interference lights are so detected as to acquire the I-signal and the Q-signal to the p-polarization component of the signal light.

Hereinafter, the function of the polarization diversity optical system device 100 will be described in detail with the help of expressions. It is assumed that the respective electric fields of the signal light S0 and the local light L0 are represented by the following vectors.

$$\vec{E}_{S0} = \begin{pmatrix} E_p \\ E_s \end{pmatrix} \quad (1)$$

$$\vec{E}_{L0} = \begin{pmatrix} E_L \\ E_L \end{pmatrix} \quad (2)$$

Components of the respective vectors in the above Expressions (1) and (2) represent the p-polarization component and the s-polarization component of the respective electric fields. In this example, taking the incompleteness of the polarization beam splitter 111 into account, when a light of the s-polarization having an electric field amplitude $E_s$ is input to the polarization beam splitter 111, a light having an electric field of $\delta E_s$ is transmitted through the polarization beam splitter 111 to produce a leak light. Likewise, when a light of the p-polarization having an electric field amplitude $E_p$ is input to the polarization beam splitter 111, a light having an electric field of $\delta E_p$ is reflected by the polarization beam splitter 111 to produce a leak light. That is, $\delta$ is a parameter representative of the magnitude of the leak light produced by the incompleteness of the polarization beam splitter. The extinction ratio of the general polarization beam splitter is about 30 dB, and a value of $\delta$ corresponding to the extinction ratio is about 0.03. Under this assumption, the electric fields of the branched signal lights S11, S12 and the branched local lights L11, L12 immediately after the respective lights have been polarization split by the polarization beam splitter 111 can be represented by Expressions (3) to (6), respectively.

$$\vec{E}_{S11}^{(p)} = \begin{pmatrix} E_p \\ \delta E_s \end{pmatrix} \quad (3)$$

$$\vec{E}_{S12}^{(s)} = \begin{pmatrix} \delta E_p \\ E_s \end{pmatrix} \quad (4)$$

$$\vec{E}_{L11}^{(p)} = \begin{pmatrix} E_L \\ \delta E_L \end{pmatrix} \quad (5)$$

$$\vec{E}_{L12}^{(s)} = \begin{pmatrix} \delta E_L \\ E_L \end{pmatrix} \quad (6)$$

Since the half-wave plate 115 has the action of replacing the p-polarization and the s-polarization with each other, the electric fields of the branched signal light S13 and the branched local light L13 immediately after having passed through the half-wave plate 115 are represented by Expressions (7) and (8), respectively.

$$\vec{E}_{S13}^{(s)} = \begin{pmatrix} E_s \\ \delta E_p \end{pmatrix} \quad (7)$$

$$\vec{E}_{L13}^{(p)} = \begin{pmatrix} \delta E_L \\ E_L \end{pmatrix} \quad (8)$$

When the branched signal lights S11, S13 and the branched local lights L12, L13 are transmitted through or reflected by the polarization beam splitter 111, the electric fields of the leak lights included in the respective lights are multiplied by $\delta$. Therefore, the electric fields of those signals immediately after having been output from the polarization beam splitter 111 are represented by Expressions (9) to (12), respectively.

$$\vec{E}_{S11}^{\prime(p)} = \begin{pmatrix} E_p \\ \delta^2 E_s \end{pmatrix} \quad (9)$$

$$\vec{E}_{S13}^{\prime(s)} = \begin{pmatrix} E_s \\ \delta^2 E_p \end{pmatrix} \quad (10)$$

$$\vec{E}_{L13}^{\prime(p)} = \begin{pmatrix} \delta^2 E_L \\ E_L \end{pmatrix} \quad (11)$$

$$\vec{E}_{L12}^{\prime(s)} = \begin{pmatrix} \delta^2 E_L \\ E_L \end{pmatrix} \quad (12)$$

Accordingly, the electric fields of the combined lights C11 and C12 are represented by Expressions (13) and (14), respectively.

$$\vec{E}_{C11}^{(s)} = \vec{E}_{S13}^{\prime(s)} + \vec{E}_{L12}^{\prime(s)} = \begin{pmatrix} E_s + \delta^2 E_L \\ E_L + \delta^2 E_p \end{pmatrix} \quad (13)$$

$$\vec{E}_{C12}^{(p)} = \vec{E}_{S11}^{\prime(p)} + \vec{E}_{L13}^{\prime(p)} = \begin{pmatrix} E_p + \delta^2 E_L \\ E_L + \delta^2 E_p \end{pmatrix} \quad (14)$$

The combined lights C11 and C12 are input to the optical 90-degree hybrid 130 and 140 having the same function, respectively. Subsequently, a process of generating the interference lights I11 to I14 from the combined light C11 in the optical 90-degree hybrid 130 will be described. Since the non-polarization beam splitter 131 branches the combined light C11 at the intensity ratio of 1:1, each electric field of the branched combined lights is $1/\sqrt{2}$ times of the electric field of the combined light C11. Also, the actions of the half-wave plates 132, 135 and the quarter-wave plate 134 are represented by matrixes (15) and (16), respectively.

$$\frac{1}{\sqrt{2}}\begin{pmatrix} 1 & 1 \\ 1 & -1 \end{pmatrix} \tag{15}$$

$$\begin{pmatrix} 1 & 0 \\ 0 & -i \end{pmatrix} \tag{16}$$

Accordingly, the electric fields of the branched combined lights C16 and C17 input to the polarization beam splitters 133 and 136 are represented by the following Expressions (17) and (18), respectively.

$$\vec{E}_{C16}^{(s1)} = \frac{1}{\sqrt{2}} \cdot \frac{1}{\sqrt{2}} \begin{pmatrix} 1 & 1 \\ 1 & -1 \end{pmatrix} \vec{E}_{C11}^{(s)} = \frac{1}{2}\begin{pmatrix} (E_s + \delta^2 E_L) + (E_L + \delta^2 E_p) \\ (E_s + \delta^2 E_L) - (E_L + \delta^2 E_p) \end{pmatrix} \tag{17}$$

$$\vec{E}_{C17}^{(s2)} = \frac{1}{\sqrt{2}} \cdot \frac{1}{\sqrt{2}} \begin{pmatrix} 1 & 1 \\ 1 & -1 \end{pmatrix}\begin{pmatrix} 1 & 0 \\ 0 & -i \end{pmatrix} \vec{E}_{C11}^{(s)} = \tag{18}$$

$$\frac{1}{2}\begin{pmatrix} (E_s + \delta^2 E_L) - i(E_L + \delta^2 E_p) \\ (E_s + \delta^2 E_L) + i(E_L + \delta^2 E_p) \end{pmatrix}$$

The branched combined lights C16 and C17 having those electric fields are polarization split, to thereby generate the interference lights I11 to I14. Therefore, the electric fields of those interference lights are represented by the following respective Expressions.

$$\vec{E}_I^{(s1)} = \tag{19}$$
$$\frac{1}{2}\begin{pmatrix} (E_s + \delta^2 E_L) + (E_L + \delta^2 E_p) \\ 0 \end{pmatrix} = \frac{1}{2}\begin{pmatrix} E_s + E_L \\ 0 \end{pmatrix} + \frac{1}{2}\delta^2\begin{pmatrix} E_p + E_L \\ 0 \end{pmatrix}$$

$$\vec{E}_I^{(s2)} = \tag{20}$$
$$\frac{1}{2}\begin{pmatrix} 0 \\ (E_s + \delta^2 E_L) - (E_L + \delta^2 E_p) \end{pmatrix} = \frac{1}{2}\begin{pmatrix} 0 \\ E_s - E_L \end{pmatrix} - \frac{1}{2}\delta^2\begin{pmatrix} 0 \\ E_p - E_L \end{pmatrix}$$

$$\vec{E}_Q^{(s1)} = \tag{21}$$
$$\frac{1}{2}\begin{pmatrix} 0 \\ (E_s + \delta^2 E_L) + i(E_L + \delta^2 E_p) \end{pmatrix} = \frac{1}{2}\begin{pmatrix} 0 \\ E_s + iE_L \end{pmatrix} + \frac{1}{2}\delta^2\begin{pmatrix} 0 \\ E_p + iE_L \end{pmatrix}$$

$$\vec{E}_Q^{(s2)} = \tag{22}$$
$$\frac{1}{2}\begin{pmatrix} (E_s + \delta^2 E_L) - i(E_L + \delta^2 E_p) \\ 0 \end{pmatrix} = \frac{1}{2}\begin{pmatrix} E_s - iE_L \\ 0 \end{pmatrix} - \frac{i}{2}\delta^2\begin{pmatrix} E_p + iE_L \\ 0 \end{pmatrix}$$

Figure 9:
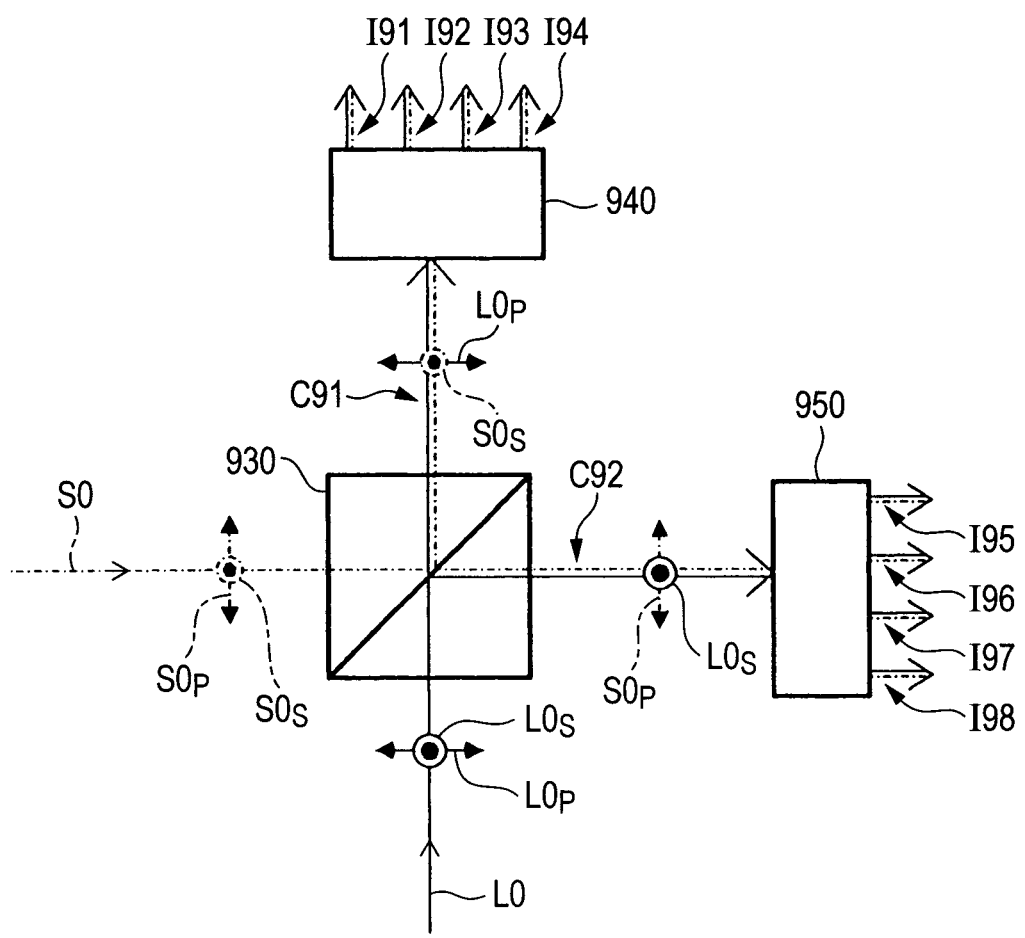
FIG. 9 is a diagram for describing a conventional polarization diversity optical system device.

Each term including $\delta$ represents the electric field of the leak light, and the amplitude of the electric field of the leak light is on the order of $\delta^2$. In this example, for comparison, the electric fields of the interference lights I91 to I94 generated by the conventional polarization diversity optical system device 900 illustrated in FIG. 9 are obtained. Because the polarization split and the combination are conducted at the same time, the electric field of the generated combined light C91 is obtained by a sum of Expressions (3) and (6), and represented by Expression (23).

$$\begin{pmatrix} \delta E_p \\ E_s \end{pmatrix} + \begin{pmatrix} E_L \\ \delta E_L \end{pmatrix} = \begin{pmatrix} E_L + \delta E_p \\ E_s + \delta E_L \end{pmatrix} \tag{23}$$

In the case where the optical 90-degree hybrid 130 is used as the interference light generator 940, the electric fields of the interference lights I91 to I94 generated from the combined light are obtained by the same calculation as the following Expressions (24) to (27), respectively.

$$\frac{1}{2}\begin{pmatrix} (E_L + \delta E_p) + (E_s + \delta E_L) \\ 0 \end{pmatrix} = \frac{1}{2}\begin{pmatrix} E_s + E_L \\ 0 \end{pmatrix} + \frac{1}{2}\delta\begin{pmatrix} E_p + E_L \\ 0 \end{pmatrix} \tag{24}$$

$$\frac{1}{2}\begin{pmatrix} 0 \\ (E_L + \delta E_p) - (E_s + \delta E_L) \end{pmatrix} = -\frac{1}{2}\begin{pmatrix} 0 \\ E_s - E_L \end{pmatrix} + \frac{1}{2}\delta\begin{pmatrix} 0 \\ E_p - E_L \end{pmatrix} \tag{25}$$

$$\frac{1}{2}\begin{pmatrix} 0 \\ (E_L + \delta E_p) + i(E_s + \delta E_L) \end{pmatrix} = \frac{i}{2}\begin{pmatrix} 0 \\ E_s - iE_L \end{pmatrix} + \frac{1}{2}\delta\begin{pmatrix} 0 \\ E_p + iE_L \end{pmatrix} \tag{26}$$

$$\frac{1}{2}\begin{pmatrix} (E_L + \delta E_p) - i(E_s + \delta E_L) \\ 0 \end{pmatrix} = -\frac{i}{2}\begin{pmatrix} E_s + iE_L \\ 0 \end{pmatrix} + \frac{1}{2}\delta\begin{pmatrix} E_p - iE_L \\ 0 \end{pmatrix} \tag{27}$$

Each term including $\delta$ represents the electric field of the leak light, and the amplitude of the electric field of the leak light is on the first order of $\delta$. That is, the magnitude of the electric field of the leak light included in the interference light generated by the polarization diversity optical system device 100 according to this embodiment is $\delta$ times as large as that in the conventional polarization diversity optical system device 900.

Accordingly, in this embodiment, after the signal light S0 and the local light L0 have been polarization split, those lights are combined together by the polarization beam splitter 111. Therefore, the leak light can be reduced.

In this embodiment, the optical 90-degree hybrid that generates the four the interference lights is used as the interference light generating means. However, even if the number of generated interference lights is lower than 4, or 5 or more, the function of the present invention is effective.

Second Embodiment

Figure 4:
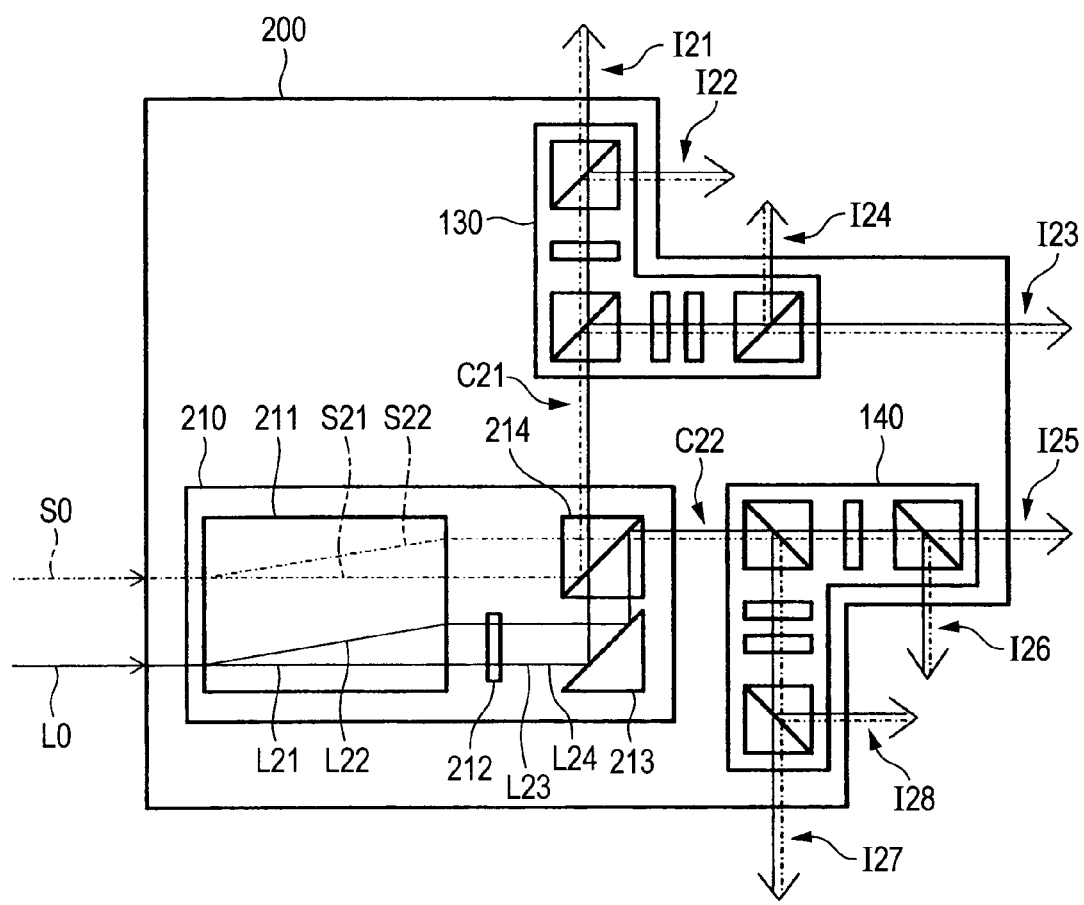
FIG. 4 is a diagram schematically illustrating a polarization diversity optical system device according to a second embodiment of the present invention.

FIG. 4 is a diagram schematically illustrating a polarization diversity optical system device 200 according to a second embodiment of the present invention. As illustrated in FIG. 4, the polarization diversity optical system device 200 includes: a combined-light generator 210 that outputs combined lights C21 and C22 from a local light L0 output from an external local oscillator and a signal light S0 on which a signal is superimposed; an optical 90-degree hybrid 130 that generates interference lights I121 to I124 from the combined light C21; and an optical 90-degree hybrid 140 that generates interference lights I25 to I28 from the combined light C22, which is identical with the optical 90-degree hybrid 130.

The combined-light generator 210 includes a beam displacer 211 that splits the local light L0 and the signal light S0, a half-wave plate 212 that rotates the polarization of split light by 90 degrees, a polarization beam splitter 214 that combines split lights together, and a prism 213 that reflects light for inputting the light to the polarization beam splitter 214. The configuration of the optical 90-degree hybrid 130 and 140 is identical with that in the first embodiment, and therefore a description thereof will be omitted.

The signal light S0 and the local light L0 are polarization split with the aid of the beam displacer 211, and the polarization directions of the respective branched local lights L21 and L22 are rotated by 90 degrees with the aid of the half-wave plate 212 (the fast axial direction is 45 degrees with respect to the s-polarization) to produce branched local lights L23 and L24. Thereafter, the branched signal light S21 and the branched local light L23 are combined together by the polarization beam splitter 214 to produce the combined light C21. Also, the branched signal light S22 and the branched local light L24 are combined together by the polarization beam splitter 214 to produce the combined light C22. Processing of the light in the optical 90-degree hybrid 130 and 140 is identical with that in the first embodiment, and therefore a description thereof will be omitted.

Accordingly, in this embodiment, as in the first embodiment, after the signal light S0 and the local light L0 have been polarization split, those lights are combined together by the polarization beam splitter 214. As a result, the leak light can be reduced.

In general, the amplitude of the electric field of the leak light generated when the light is polarization split with the aid of the beam displacer is about 0.1 times when the polarization beam splitter is used. Therefore, the polarization diversity optical system device 200 according to this embodiment can reduce the leak light more than that in the polarization diversity optical system device 100 according to the first embodiment.

Also, in this embodiment, because the polarization and split of the signal light S0 and the local light L0 are conducted by the same displacer, a distance between the optical axes of the branched signal lights S21 and S22 is equal to a distance between the optical axes of the branched local lights L21 and L22. Further, since the s-polarization component and the p-polarization component branched by the beam displacer are output in parallel, the optical axes of the branched signal light S22 and the branched local light L24 automatically match each other, for example, when the optical axes of the branched signal light S21 and the branched local light L23 are made to match each other.

That is, the number of adjustment portions of optical axis alignment required in generating the two combined lights C21 and C22 is only one. When the polarization split of the signal light S0 and the polarization split of the local light L0 are conducted by different beam displacers, in order to generate the two combined lights C21 and C22 by one optical axis adjustment, there is a need to use the beam displacers that are the same in thickness in the light propagating direction with high precision.

Third Embodiment

Figure 5:
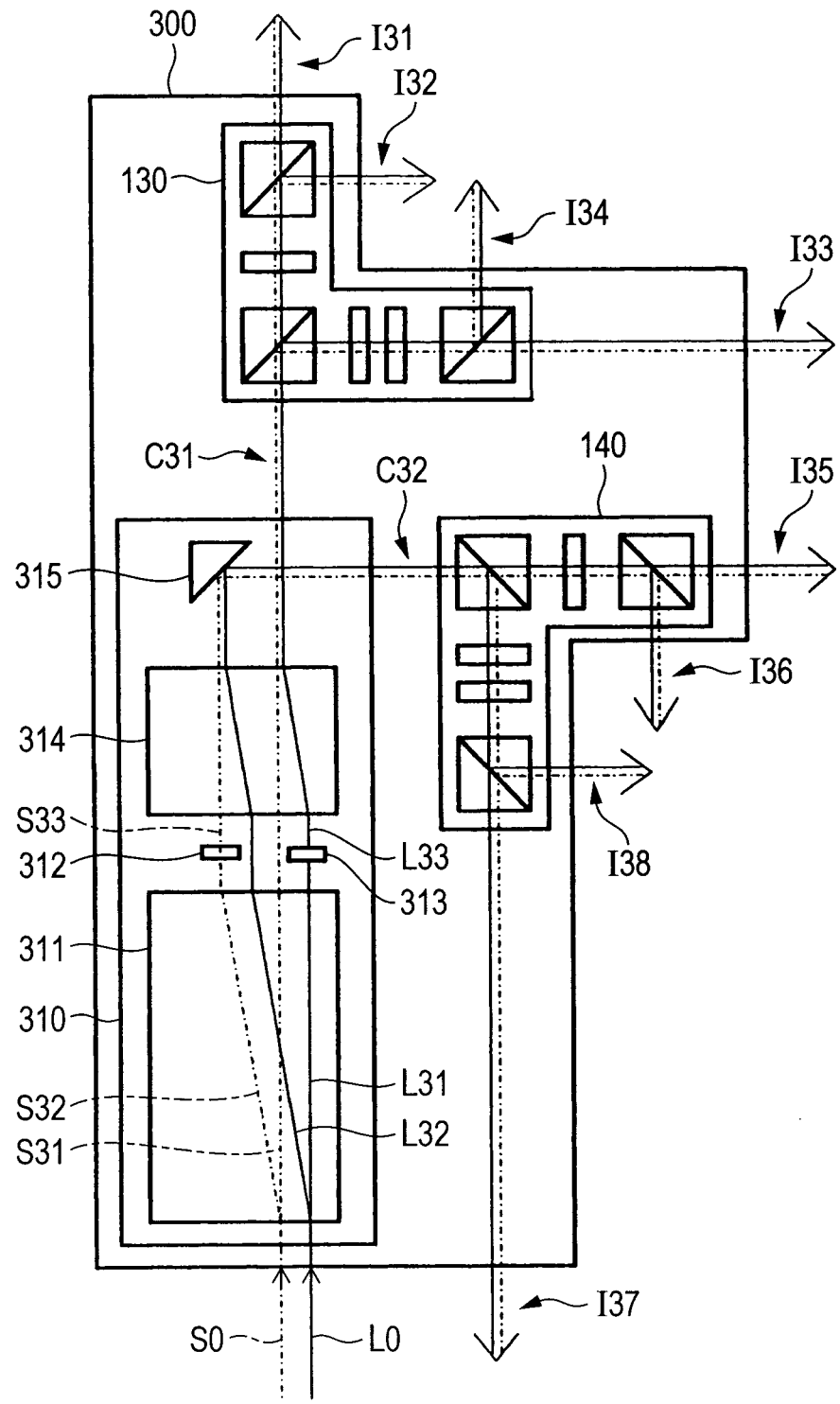
FIG. 5 is a diagram schematically illustrating polarization diversity optical system device according to a third embodiment of the present invention.

FIG. 5 is a diagram schematically illustrating a polarization diversity optical system device 300 according to a third embodiment of the present invention. As illustrated in FIG. 5, the polarization diversity optical system device 300 includes: a combined-light generator 310 that outputs combined lights C31 and C32 from a local light L0 output from an external local oscillator and a signal light S0 on which a signal is superimposed; an optical 90-degree hybrid 130 that generates interference lights I131 to I134 from the combined light C31; and an optical 90-degree hybrid 140 that generates interference lights I35 to I38 from the combined light C32.

The combined-light generator 310 includes a beam displacer 211 that splits the local light L0 and the signal light S0, half-wave plates 312 and 313 that rotate the polarization of split light by 90 degrees, a beam displacer 314 that combines the split lights together, and a prism 315 that reflects light. The configuration of the optical 90-degree hybrid 130 and 140 is identical with that in the first embodiment, and therefore a description thereof will be omitted.

In the combined-light generator 310 according to this embodiment, the signal light S0 and the local light L0 are polarization split with the aid of the beam displacer 311, the polarization directions of the branched signal light S32 and the branched local light L31 are rotated by 90 degrees to produce the branched signal light S33 and the branched local light L33 with the aid of the half-wave plates 312 and 313, and thereafter the branched signal light S33 and the branched local light L32, and the branched signal light S31 and the branched local light L33 are combined together by the beam displacer 314. The processing of the light in the optical 90-degree hybrid 130 and 140 is identical with that in the first embodiment, and therefore a description thereof will be omitted.

Accordingly, in the polarization diversity optical system device 300 according to this embodiment, because the beam displacers from which the light is hardly leaked are used for both of the polarization split and the combination, the leak light can be made smaller than that in the polarization diversity optical system device 100 according to the first embodiment. Further, as in the second embodiment, because the polarization split of the signal light S0 and the local light L0 is conducted by the identical beam displacer, the adjustment of the optical axis alignment necessary for generating the combined lights L11 and L21 may be conducted at only one portion.

Fourth Embodiment

Figure 6:
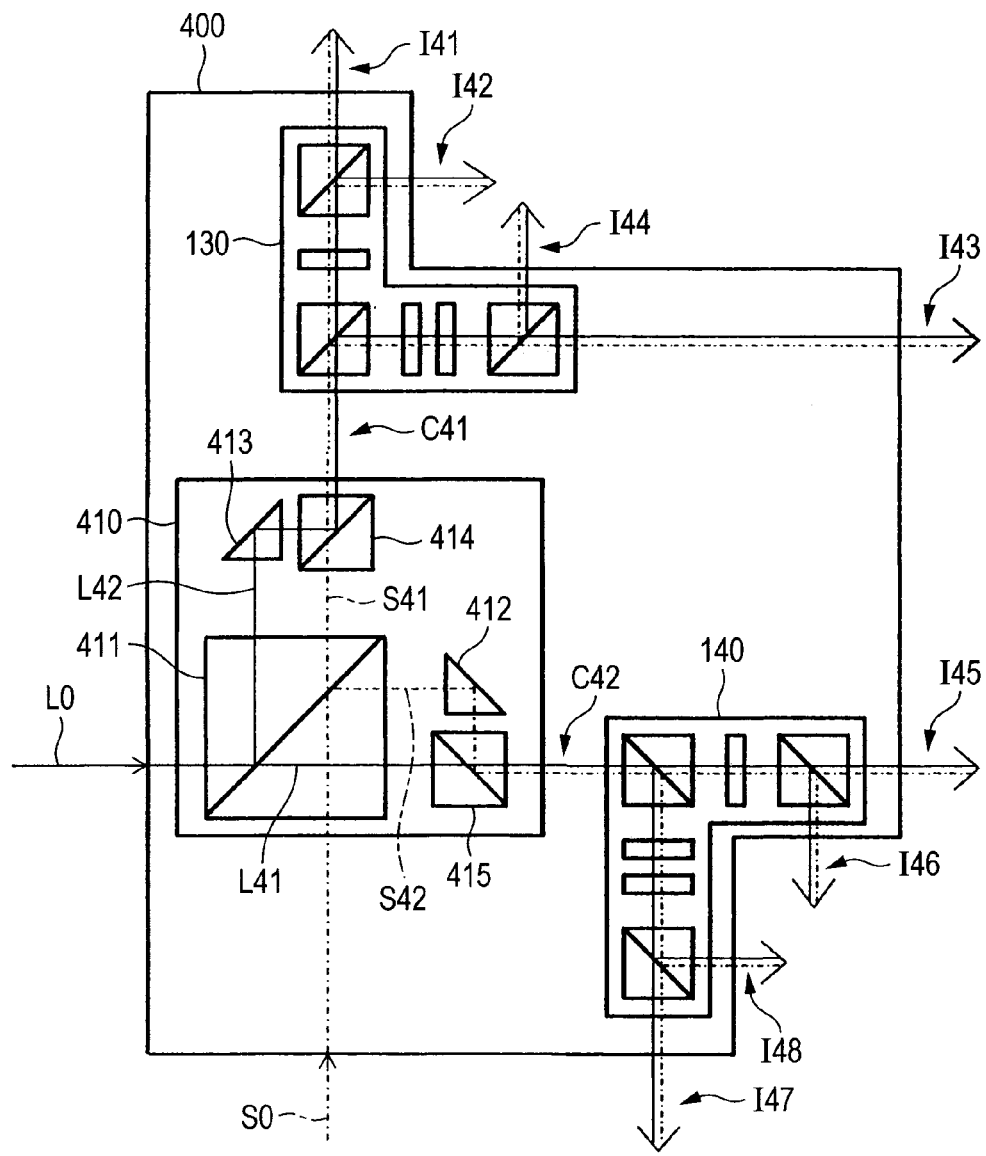
FIG. 6 is a diagram schematically illustrating a polarization diversity optical system device according to a fourth embodiment of the present invention.

FIG. 6 is a diagram schematically illustrating a polarization diversity optical system device 400 according to a fourth embodiment of the present invention. As illustrated in FIG. 6, the polarization diversity optical system device 400 includes: a combined-light generator 410 that outputs combined lights C41 and C42 from a local light L0 output from an external local oscillator and a signal light S0 on which a signal is superimposed; an optical 90-degree hybrid 130 that generates interference lights I141 to I144 from the combined light C41; and an optical 90-degree hybrid 140 that generates interference lights I45 to I48 from the combined light C42.

In this example, the combined-light generator 410 includes a polarization beam splitter 411 that splits the local light L0 and the signal light S0, polarization beam splitters 414 and 415 that combine the split lights together, and prisms 412 and 413 for reflecting the lights. The configuration of the optical 90-degree hybrid 130 and 140 is identical with that in the first embodiment, and therefore a description thereof will be omitted.

In the combined-light generator 410 according to this embodiment, the signal light S0b and the local light L0 are polarization split with the aid of the beam displacer 411, the branched signal light S41 and the branched local light L42 are combined together by the polarization beam splitter 411, and the branched signal light S42 and the branched local light L41 are combined together by the polarization beam splitter 415. The processing of the light in the optical 90-degree hybrid 130 and 140 is identical with that in the first embodiment, and therefore a description thereof will be omitted.

Accordingly, in this embodiment, as in the first embodiment, after the signal light S0 and the local light L0 have been polarization split, those signal and local lights S0 and L0 are combined together by the polarization beam splitters 414 and 415. As a result, the leak light can be reduced. In this embodiment, because the polarization of the split lights is combined together without rotation, a polarization rotating unit such as a half-wave plate is unnecessary.

Fifth Embodiment

Figure 7:
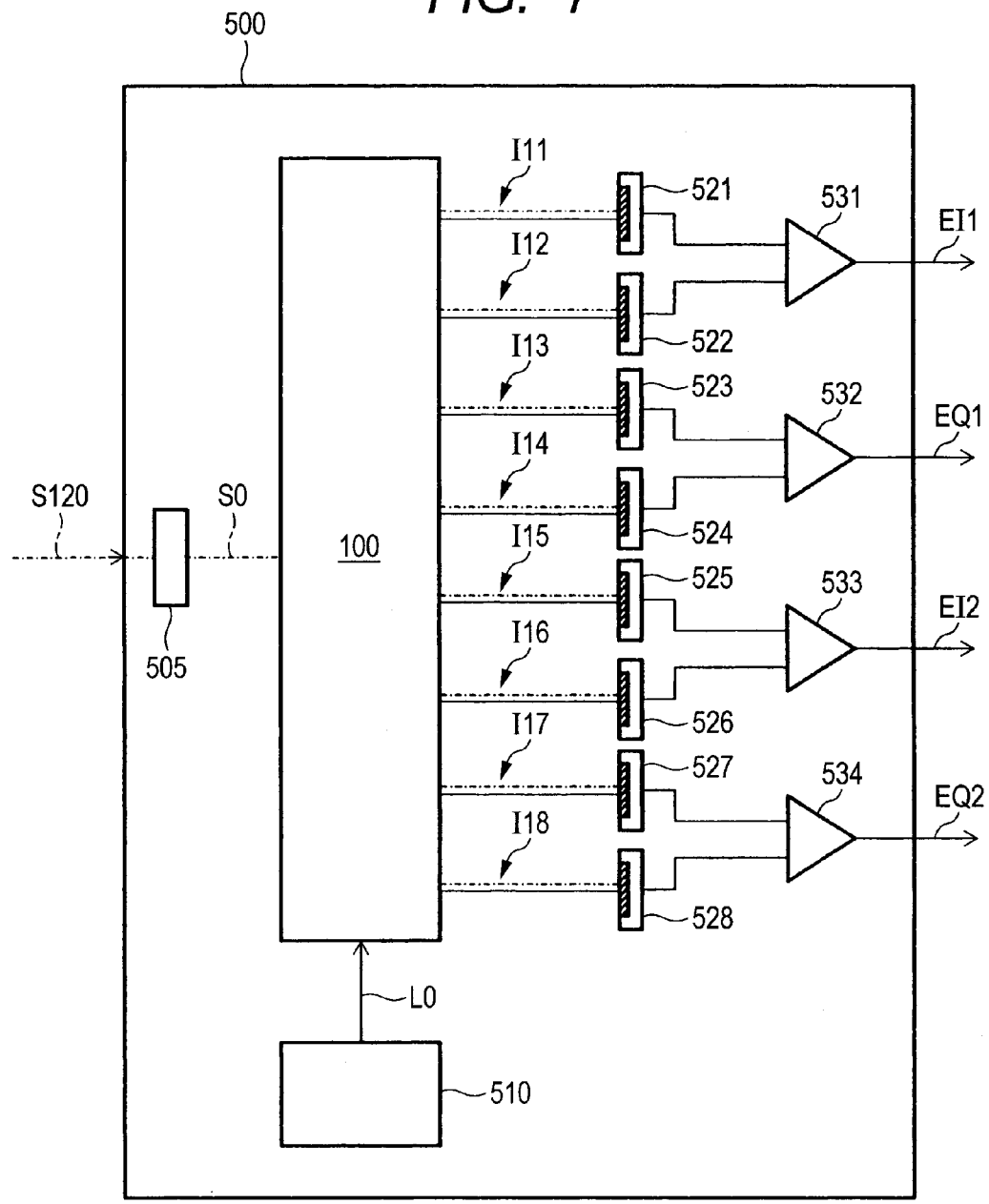
FIG. 7 is a diagram schematically illustrating a demodulator for optical communication according to a fifth embodiment of the present invention.

FIG. 7 is a diagram schematically illustrating a demodulator 500 for optical communication according to a fifth embodiment of the present invention. As illustrated in FIG. 7, the demodulator 500 includes the polarization diversity optical system device 100 according to the first embodiment, a collimator 505 that outputs a light that has propagated through an optical fiber, a local oscillator 510, photodetectors 521 to 528 that detect the respective interference lights I11 to I18 output from the polarization diversity optical system device 100, and transimpedance amplifiers 531 to 534 that output an output signal proportional to the intensity difference of the interference light.

The signal light S0 output from the collimator 505 and the local light L0 output from the local oscillator 510 are input to the polarization diversity optical system device 100 to generate the interference lights I11 to I18. The interference lights I11 to I18 are detected by the photodetectors 521 to 528, and output signals EI1, EQ1, EI2, and EQ2 proportional to the intensity differences of the respective the interference lights are output from the transimpedance amplifiers 531 to 534.

In this example, a description will be given with reference to Expressions. An electric signal proportional to the intensity difference of the interference lights I11 and I12 becomes an I signal to the s-polarization component of the signal light, and an electric signal proportional to the intensity difference of the interference lights I13 and I14 becomes a Q signal to the s-polarization component of the signal light. Those signals are approximately represented by the following Expressions (28) and (29).

$$I_s = |E_I^{(s1)}|^2 - |E_I^{(s2)}|^2 = \eta|E_s||E_L|\cos(\theta_s - \theta_L) + \eta|E_s||\delta^2 E_p|\cos(\theta_s - \theta_p) \quad (28)$$

$$Q_s = |E_Q^{(s2)}|^2 - |E_Q^{(s1)}|^2 = \eta|E_s||E_L|\sin(\theta_s - \theta_L) + \eta|E_s||\delta^2 E_p|\sin(\theta_s - \theta_p) \quad (29)$$

In this example, $\theta_s$ and $\theta_p$ are phases of $E_s$ and $E_p$, respectively, $\theta_L$ is a phase of $E_L$, and $\eta$ is a conversion efficiency from intensity of the detected light to voltage. Also, it is assumed that a DC component of the output signal is eliminated by an AC coupling. When it is assumed that errors of the output signals generated by the leak light are $\Delta I_s$ and $\Delta Q_s$, since those signals are obtained by differences between $I_s$, $Q_s$ and values $I_{s0}$, $Q_{s0}$ when $\delta=0$, respectively, those signals are represented by the following Expressions (30) and (31).

$$\Delta I_s = I_s - I_{s0} = \eta|E_p||\delta^2 E_s|\cos(\theta_s - \theta_p) \quad (30)$$

$$\Delta Q_s = Q_s - Q_{s0} = \eta|E_p||\delta^2 E_s|\sin(\theta_s - \theta_p) \quad (31)$$

In this example, for comparison, errors $\Delta I_s'$ and $\Delta Q_s'$ of the output signals when a conventional interferometer illustrated in FIG. 9 is used are calculated under the electric field of the interference lights given by Expressions (24) to (27) as Expressions (32) and (33).

$$\Delta I_s' = \eta|E_p||\delta E_s|\cos(\theta_s - \theta_p) \quad (32)$$

$$\Delta Q_s' = \eta|E_p||\delta E_s|\sin(\theta_s - \theta_p) \quad (33)$$

As is apparent from Expressions (30) to (33), with application of the polarization diversity optical system device 100 according to this embodiment, the error of the output signal caused by the leak light can be reduced by $\delta$ times.

Subsequently, an error of the demodulated signal caused by the error of the output signal is estimated when the phase modulation signal is demodulated by the demodulator 500 with the aid of the polarization diversity optical system device 100 according to this embodiment. The phase of the s-polarization component of the signal light based on the phase of the local light L0 is obtained by operation of arctan (Q/I) when $\delta=0$. However, the phase is deviated from a true value when $\delta \neq 0$, the phase difference $\Delta\theta$ occurs. $\Delta\theta$ is represented by the following Expression (34).

$$\Delta\theta_s = \arctan\left(\frac{Q_{s0}}{I_{s0}}\right) - \arctan\left(\frac{Q_{s0} + \Delta Q_s}{I_{s0} + \Delta I_s}\right) \quad (34)$$

Expression (34) is expanded to first order with respect to $\Delta I_s$ and $\Delta Q_s$, and represented by Expression (35) as a result of organizing the expression with the help of Expressions (28) to (31).

$$\Delta\theta_s \approx \frac{|\delta^2 E_p|}{|E_L|}\sin(\theta_p - \theta_L) \quad (35)$$

On the other hand, the phase error $\Delta\theta_s'$ occurring in the demodulator using the conventional polarization diversity optical system device 900 in FIG. 9 is obtained from Expressions (32) and (33) through the same calculation to obtain Expression (36)

$$\Delta\theta_s' = \arctan\left(\frac{Q_{s0}}{I_{s0}}\right) - \arctan\left(\frac{Q_{s0} + \Delta Q_s'}{I_{s0} + \Delta I_s'}\right) \approx \frac{|\delta E_p|}{|E_{LO}|}\sin(\theta_p - \theta_L) \quad (36)$$

Through the above Expressions (35) and (36), when $\delta=0.03$ and $|E_p|/|E_L|=0.5$, the conventional phase error $\Delta\theta_s'$ is about 0.86 degrees at the maximum whereas the phase error $\Delta\theta_s'$ according to this embodiment is about 0.026 degrees at the maximum, and the phase error occurring when the polarization diversity optical system device 100 according to this embodiment is used is smaller than that in the conventional polarization diversity optical system device 900.

Accordingly, in the demodulator 500 according to this embodiment, because the polarization diversity optical system device 100 is used, the error of the output signal generated by the leak light is smaller than that in the case of using the conventional polarization diversity optical system device 900. As a result, the phase modulation signal can be demodulated with precision. In this example, the demodulation of the phase modulation signal has been described. Similarly, an amplitude modulation signal, a frequency modulation signal, and a quadrature amplitude modulation signal can be also demodulated.

Sixth Embodiment

Figure 8:
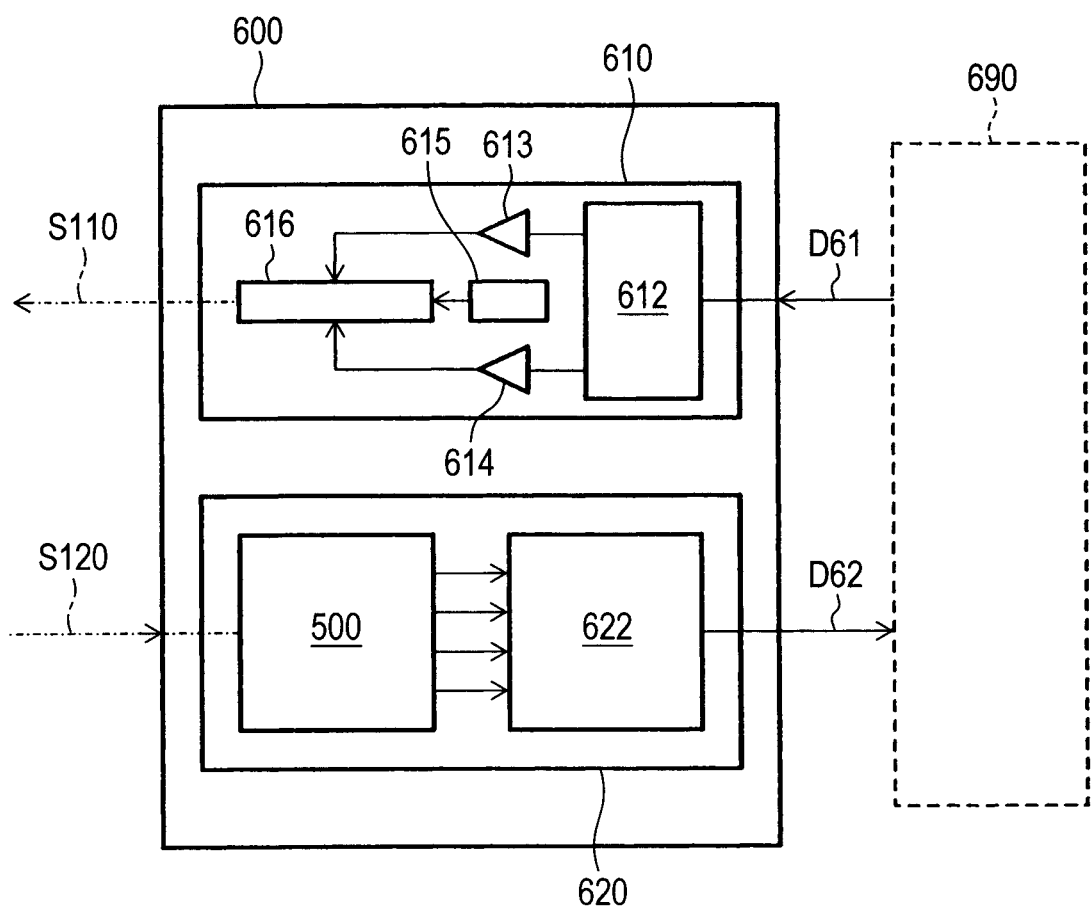
FIG. 8 is a diagram schematically illustrating a transceiver for optical communication according to a sixth embodiment of the present invention.

FIG. 8 is a diagram schematically illustrating a transceiver 600 for optical communication according to a sixth embodiment of the present invention. As illustrated in FIG. 8, the transceiver 600 includes a transmitter 610 and a receiver 620. The transmitter 610 includes a signal processor 612 that modulates data D61 to be transmitted, which has been received from a controller 690, amplifiers 613 and 614 that amplify the data output by the signal processor 612, a light source 615, and a phase modulator 616 that modulates a light output from the light source 615 with the data amplified by the amplifiers 613 and 614.

The receiver 620 includes the demodulator 500 according to the fourth embodiment, and a signal processor 622 that converts a signal output from the demodulator 500 into a data signal.

In the transmitter 610, a data signal D61 input to the signal processor 612 is divided into two signals, and two divided data modulation signals are generated. After those data modulation signals have been amplified by the amplifiers 613 and 614, the amplified signals are output to the phase modulator 616. The light output from the light source 615 is input to the phase modulator 616, and the phase modulator 616 modulates the input light with the two data modulation signals output from the amplifiers 613 and 614, and outputs an unmodulated signal S110.

In the receiver 620, the signal light that has propagated through an optical fiber is input to the demodulator 500 of the fifth embodiment where four output signals EI1, EQ1, EI2, and EQ2 are generated. Those four output signals EI1, EQ1, EI2, and EQ2 are input to the signal processor 622 where the data signal D62 is restored.

Accordingly, in the transceiver 600 according to this embodiment, because the polarization diversity optical system device 100 is used as with the demodulator 500 of the fifth embodiment, the error of the output signal generated by the leak light is smaller than that in the case of using the conventional polarization diversity optical system device 900, and the signal can be demodulated with precision.

What is claimed is:

1. A polarization diversity optical system device, comprising:
    a polarization split unit having a first split part that splits a first coherent light into a first split light and a second split light whose polarization components are orthogonal to each other, and a second split part that splits a second coherent light into a third split light and a fourth split light whose polarization components are orthogonal to each other; and
    a light combining unit having a first combine part that combines the first split light with one of the third split light and the fourth split light, and a second combine part that combines the second split light with the other of the third split light and the fourth split light,
    wherein each of the first split part, the second split part of the polarization split unit, the first combine part and the second combine part of the light combining unit has a polarization split function, and the first split part, the second split part of the polarization split unit, the first combine part and the second combine part of the light combining unit are located at different positions from each other on one plane.

2. The polarization diversity optical system device according to claim 1, further comprising:
    a polarization rotation unit that rotates polarization of two split lights of the first to fourth split lights by 90 degrees.

3. The polarization diversity optical system device according to claim 1,
    wherein one of the first coherent light and the second coherent light is a local light output from a local oscillator, and
    wherein the other of the first coherent light and the second coherent light is a signal light on which information is superimposed.

4. The polarization diversity optical system device according to claim 1,
    wherein the polarization split unit and the light combining unit are realized by one combined-light generator, and
    wherein the combined-light generator has one polarization beam splitter.

5. The polarization diversity optical system device according to claim 1,
    wherein the polarization split unit is a beam displacer, and
    wherein the light combining unit is a polarization beam splitter.

6. The polarization diversity optical system device according to claim 1, wherein the polarization split unit and the light combining unit are beam displacers different from each other.

7. The polarization diversity optical system device according to claim 1, further comprising: an interference light generator that converts the combined light into an interference light.

8. A demodulator comprising:
    the polarization diversity optical system device according to claim 1; and
    a photodetector that detects a light output from the polarization diversity optical system device, and outputs an electric signal.

9. An optical transceiver having a transmitter and a receiver,
    wherein the receiver has the demodulator according to claim 8, and
    wherein the transmitter has a phase modulator that superimposes a signal on a coherent light.

* * * * *